(No Model.)
J. E. BROWN.
ELECTRIC LIGHT FIXTURE.
No. 437,851. Patented Oct. 7, 1890.
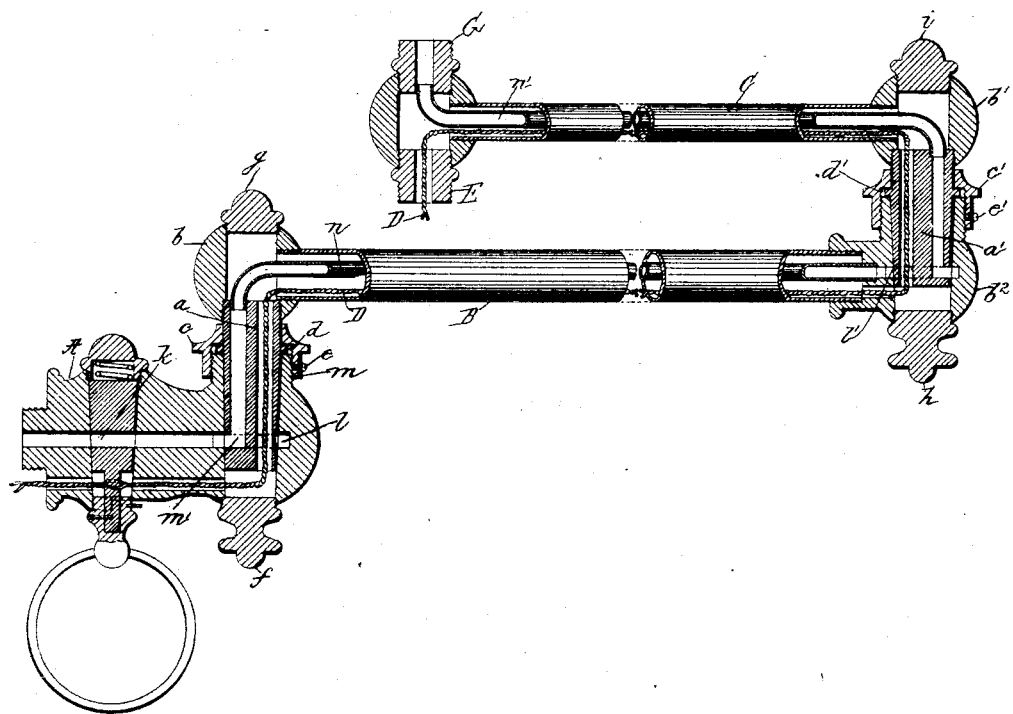
Witnesses:
John Buckler,
L. H. Osgood
Inventor:
James E. Brown,
By Worch Osgood,
Attorney.

UNITED STATES PATENT OFFICE.

JAMES E. BROWN, OF BROOKLYN, NEW YORK, ASSIGNOR TO THE ARCHER & PANCOAST MANUFACTURING COMPANY, OF NEW YORK.

ELECTRIC-LIGHT FIXTURE.

SPECIFICATION forming part of Letters Patent No. 437,851, dated October 7, 1890.

Application filed June 21, 1890. Serial No. 356,218. (No model.)

*To all whom it may concern:*

Be it known that I, JAMES E. BROWN, of Brooklyn, county of Kings, and State of New York, have invented certain new and useful Improvements in Electric-Light Fixtures, of which the following is a full, clear, and exact description, reference being had to the accompanying drawing, and to the letters of reference marked thereon.

My invention relates to fixtures or appliances for sustaining electric lamps and gas-burners, and particularly to the style known as "brackets," which are generally applied against a vertical wall, but which may be applied to any sustaining surface, wall, or object, the brackets having one, two, or more joints, so that the light may be moved. Heretofore these brackets, in order that they may receive the electric wires or conductors, or in order that they may be "wired up," have been so constructed that they require to be first disjointed or dismounted from the wall or that their parts may be separated one from the other to be reassembled after the wiring is accomplished, and the joints as heretofore constructed are necessarily large, including complicated parts, which are difficult and expensive to manufacture and difficult and expensive to adjust, to dismount, and to rearrange after the wires are located.

The object of my invention is to produce a simple, cheap, compact, and substantial bracket which may be easily made, mounted, and wired up without disturbing the joints and to adapt the bracket for use as a combination-bracket—that is, one which sustains a gas-burner as well as an electric lamp, preserving the joints gas-tight, at the same time admitting the ready application of the wires.

To accomplish all of this and to secure other and further advantages in the matters of construction, application, operation, and use my improvements involve certain new and useful arrangements or combinations of parts, as will be herein first fully described, and then pointed out in the claims.

In the accompanying drawing, forming part of this specification, the single figure is a vertical view, partly in section and partly in elevation, of one of my improved brackets with two joints adapted to sustain both a gas-burner and an electric lamp.

A is the base-piece or wall-piece, which is applied in any desirable way against the object on which the bracket is to be supported. It may be threaded in or on a pipe or a convenient piece adapted to receive it. It is usually insulated from the wall or other object, and is to be connected with a gas-pipe or branch.

B is a tubular section of the bracket, connected with the base by a joint, which permits the bracket to move or swing. This joint is composed of a socket or seat formed in the base and a hollow section $a$, fitted to turn in the said socket or seat. The union between the hollow plug $a$ and the tubular section B is made by an elbow, (shown in the shape of a ball,) as $b$, or it may be by any desired shape or figure of elbow. The plug $a$ is held to its seat by use of a screw-cap or collar $c$, fitted upon the wall of the socket and bearing upon a ledge $d$ upon the plug. After the plug is brought down to the desired firmness of bearing upon its seat, the collar $c$ is locked in place, as by a simple set-screw $e$, and the joint need not be afterward disturbed, unless after long wear it may be desired to tighten it up.

The bracket may be used with only the one swinging or moving section, or if others be desired they may be connected with the first section.

C is an additional tubular section, connected with section B by a hollow plug $a'$, elbows $b'$ $b^2$, collar $c'$, flange $d'$, and set-screw $e'$, substantially like the corresponding parts in the joint previously described, except at this point the elbow-piece $b^2$ is usually made smaller and lighter than the base. There are openings through the plugs $a$ $a'$ of diameter sufficient to accommodate the wires and their insulating-coverings, the said wires being represented as twisted or otherwise formed into a single cord, as at D.

E is any seat or coupling for an electric lamp. When the electric lamp is in place, it operates to prevent one section of the bracket from swinging over or across the other by which the wires might be eventually cut or broken so as to break the connection. Of course this should be guarded against in any swinging bracket of this character, and other arrangements may be adopted for this purpose.

At f, g, h, and i (and at other joints, if more be used) are removable plugs which may be easily dismounted without disturbing any other parts of the fittings. These are preferably threaded so they can be turned in securely.

With the bracket thus far described, whether or not it be mounted in place for use, the wiring or running of the wires through it may be easily and quickly accomplished without in any manner disturbing the hinge-joints which may be supposed to have been set and adjusted once for all. To do this wiring I remove the several plugs f g h i, insert the cord D through the base-piece, carrying it down through the seat for plug f. Then I turn the end of the cord back through the same opening, through the perforation provided for it in plug a, and through the seat for plug g, and pull it taut. I next pass the end back through the seat for plug g, through the tubular section B, and out through the seat for plug h and pull it taut, and so on to and through the lamp-seat E, when the wiring is completed, after which the various plugs are replaced and the electric lamp applied. Following the same plan the wiring might proceed from the free end of the bracket in the opposite direction.

At k is a gas-channel leading through the base and communicating with a recess l, cast or otherwise formed in the base and extending around the seat for the turning-plug a. The plug a is perforated through and through for the passage of the wires, extends below or past the recess l, and has a gas-channel m, with a branch m', so located as to communicate always with the recess l in order to take gas therefrom. The plug is of course seated gas-tight.

Secured in the upper end of gas-channel m, as by soldering or otherwise, is a small gas-tube n, the same extending through the tubular section B, leaving ample room beside it for the wires. This tube n leads either to the seat for the gas-burner, or if a second swinging or movable section be employed, as shown, then it leads into a recess l', surrounding the lower end of the next turning-plug a', which latter is perforated through and through for the wires, and has a gas-channel similar to the one before described. From this last-named gas-channel another gas-tube n' leads through section C and out at a seat G for a gas-burner, or to another joint, if another be used. The interior gas-tubes turn always with the plugs, so they are not liable to become disarranged or damaged.

The base receives the wires through a perforation outside the gas-channel k.

The set-screw e is not indispensable, and other means might be employed for securely holding the caps. The forms of these caps may also be varied, as may the manner of their engagement with the plugs, it being only necessary that they hold the plugs to their seats and be operable from the exterior of the fixture.

In previous forms or constructions at the outset alluded to a pocket or chamber of capacity sufficient to accommodate a bend or fold in the wires was or is necessitated in the region of each angle or turn, and this increases the size of the fitting to such extent as to make them unsightly and unwieldy, to say nothing of the increased weight of material and expense of fitting. By my construction I am enabled to make the joints small and compact and save in weight and cost of manufacture.

The movements of the bracket can in no way impede the flow of gas or obstruct the gas-channel, nor can such movements operate to break or cut the wires or buckle them so they will cramp the sections of the bracket.

Having now fully described my invention, what I claim as new herein, and desire to secure by Letters Patent, is—

1. In a joint for an electric-light bracket, the combination, with the turning-plug perforated for the passage of gas and for the electric conductors, of the socket-piece recessed, as explained, one elbow-piece mounted on said plug, a gas-tube secured to the plug and communicating with the gas-channel therein, and a cap holding said plug to its seat, the socket-piece and elbow being perforated to permit adjustment of the wires without disturbing the joint, substantially as and for the purposes set forth.

2. In an electric-light bracket, the combination of an elbow, a perforated turning-plug connected therewith, a socket-piece, a tubular section connected with the elbow, and a gas-tube secured to the plug and located in said tubular section, substantially as shown and described.

In testimony that I claim the foregoing I have hereunto set my hand in the presence of two witnesses.

JAMES E. BROWN.

Witnesses:
JOHN BUCKLER,
WORTH OSGOOD.